J. P. VAN BOGAERT.
INTEGRAPH AND DIFFERENTIATOR.
APPLICATION FILED MAR. 25, 1919.

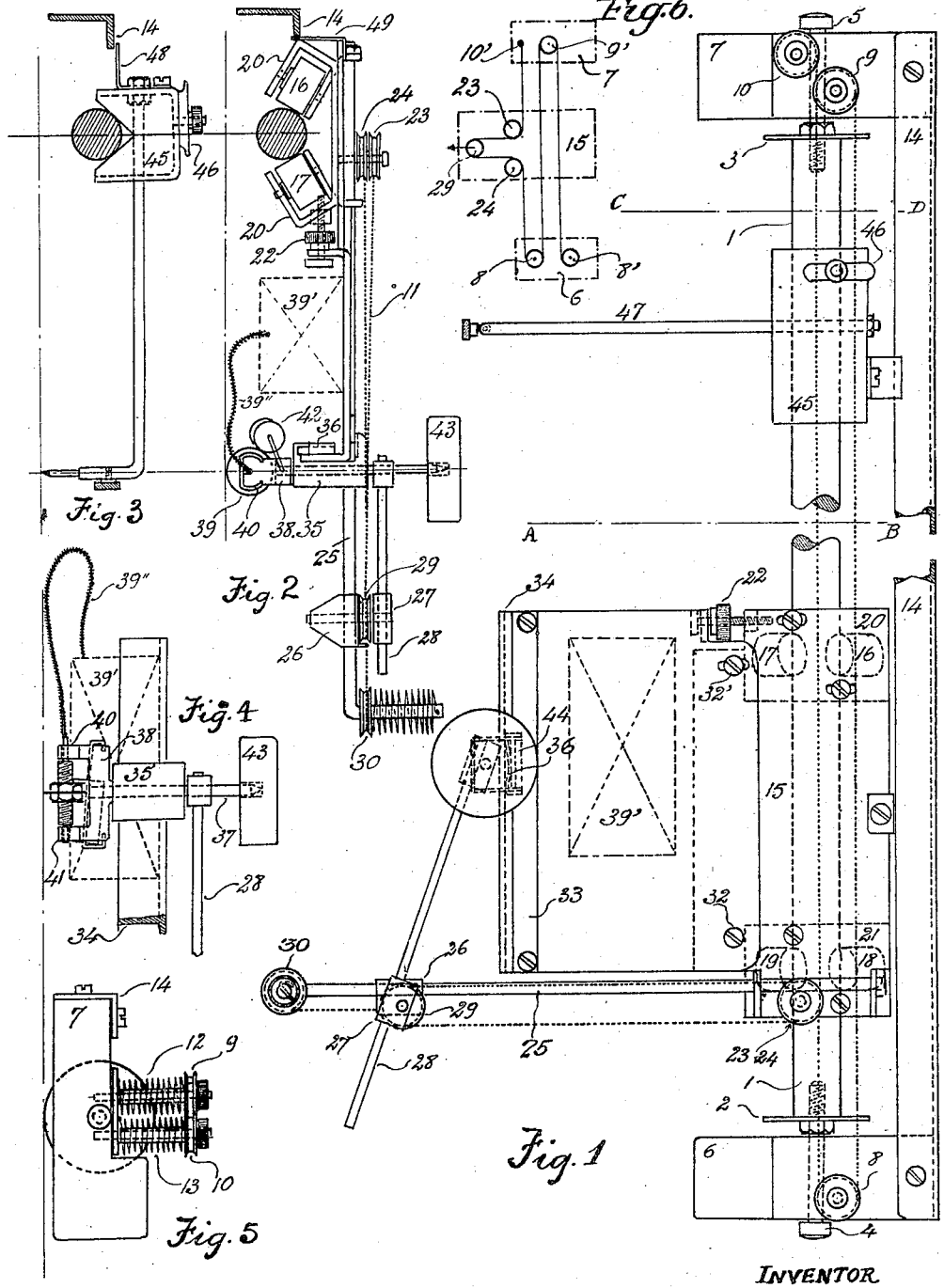

1,380,754.

Patented June 7, 1921.
2 SHEETS—SHEET 2.

UNITED STATES PATENT OFFICE.

JOHN PHILIP VAN BOGAERT, OF BRUSSELS, BELGIUM.

INTEGRAPH AND DIFFERENTIATOR.

1,380,754.   Specification of Letters Patent.   Patented June 7, 1921.

Application filed March 25, 1919. Serial No. 285,083.

*To all whom it may concern:*

Be it known that I, JOHN PHILIP VAN BOGAERT, a subject of the King of Belgium, residing at 428 Boulevard Lambermont, Brussels, Belgium, have invented new and useful Improvements in Integraphs and Differentiators, of which the following is a specification.

This invention has reference to improvements in or relating to integraphs and differentiators and it consists in an improved integraph adapted to be used as a differentiator and to be employed for plotting either the integral or the differential curve of a given curve on the same ordinates. The improved instrument is useful for general integration, derivation research of surfaces, moments, bending and shearing stresses in girders, angular and linear deflections in girders of variable section and in arches, and other similar purposes.

So far as I am aware, no instrument is known which combines the functions of an integraph and a differentiator, but there are several known types of integraphs, and my improved instrument is of the type having a vertical tracing wheel whose projection on the plane has always a gradient proportional to the ordinate of the original curve.

My improved instrument comprises three fundamental parts; a shaft on each end of which a supporting wheel is fixed and which serves as a guide rod and gives a parallel translation to the complete apparatus; a slide mounted on the said shaft or on a guide bar or rod parallel to the said shaft and movable therewith and carrying a pointer or pencil; and a truck which is moved along the shaft by the axial component of the tracing wheel which rolls without slipping on the drawing paper. And a characteristic feature of my said instrument, as an integraph and in comparison with the known integraphs, is that the movement of the pointer along the shaft is transferred to a slide carried by the truck and the sliding movement of this slide is independent of the movement of translation of the truck along the shaft.

When the instrument is used as a differentiator, the tracing wheel is led over the original curve and the pointer or pencil traces the differential curve.

Among the advantages obtained by constructing an integraph in accordance with my invention may be mentioned: (1) the difference between the maximum and minimum ordinates of the original curve is only limited by the length of the shaft—which is unrestricted; (2) the range of variation of the polar distance is more than double that of any of the known integraphs of the same size; (3) the passing from positive to negative polar distances is simplified; and (4) the truck can be readily put into the place of the slide, or vice versa, thus permitting of any desired number of successive integrations being made without lifting the whole apparatus off the paper.

My invention also comprises a novel feature in that it provides a means of compensating for the lateral reaction on the tracing wheel necessary to move the truck, thus preventing the said wheel from slipping under considerable gradients.

I have illustrated an embodiment of my invention in the accompanying drawing, in which:

Figure 1 is a plan view of the complete instrument;

Fig. 2 is an elevation on the line A—B of Fig. 1;

Fig. 3 is an elevation on the line C—D of Fig. 1;

Figs. 4 and 5 show details hereinafter referred to; and

Figs. 6 and 7 are diagrams, also hereinafter referred to.

Figure 7:
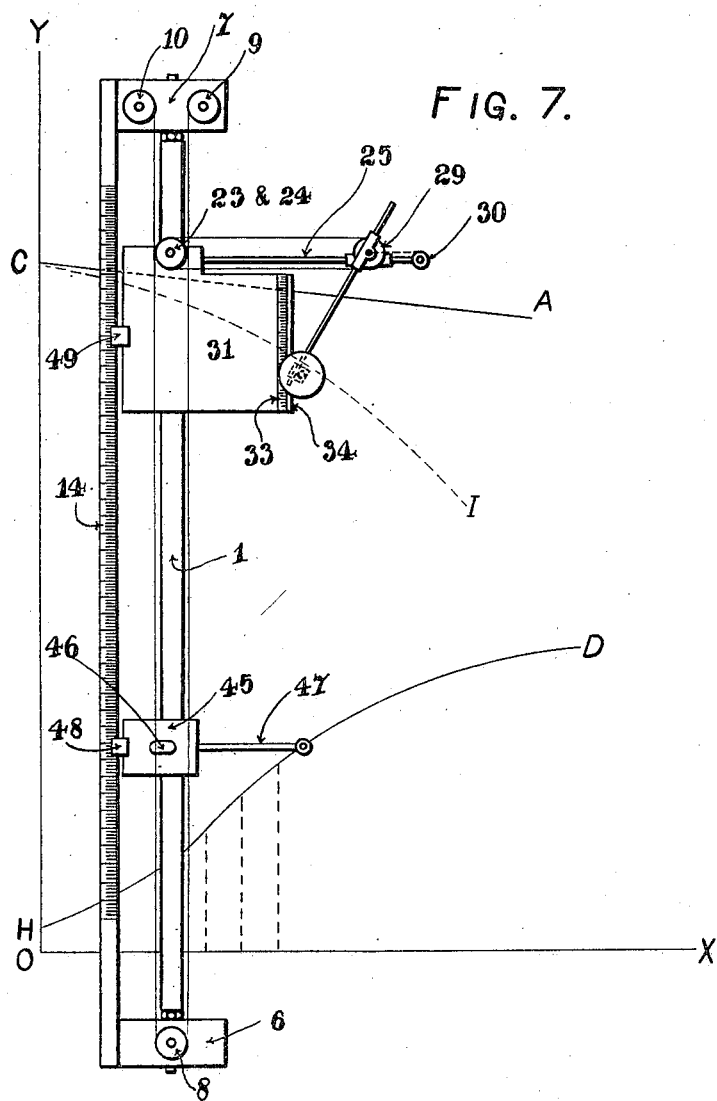

Referring to the drawing: 1 is a shaft provided at its ends with knurled disks 2, 3, of equal diameter, which roll upon the paper on the drawing table and are fixed to the shaft by means of lock nuts on spindles 4, 5 screwed into the ends of the shaft. These spindles carry weights 6, 7, shown as rectangular blocks, the spindles passing freely through holes in the blocks.

On the weight 6 a small grooved pulley 8 is mounted on a vertical pin, and the weight 7 carries two reels 9, 10 provided with clamping nuts and on which the end portions of a thread or fine wire 11, which passes over the pulley 8 and other pulleys hereinafter referred to, are wound. The said thread is maintained in tension by springs 12, 13 (see Fig. 5) which tend to turn the reels to wind up the thread. The weights also carry a scale 14 which extends parallel to the shaft 1, along the front of the instrument.

A truck 15 is mounted upon the shaft 1 on inclined rollers 16, 17, 18, 19 which are rotatable in bearings 20, 21, one of which

(20) is adjustable by means of a nut 22, and this truck carries a vertical pin, on which two pulleys 23, 24 are mounted, and a horizontal guide rod 25 on which a slide 26 is mounted. The slide 26 is pivotally connected by a pin to a slide 27 which is movable along a guide rod 28, which also serves as a lever, and the said pin carries a pulley 29 (see Fig. 2). A thread or fine wire which is wound on a tension reel 30 mounted at the free end of the guide rod 25 and attached to the slide 26 is caused to exert a constant pull upon the slide by the action of a spring, thus tending to draw the slides 26, 27, toward the said reel along the guide rods 25 and 28 respectively. It will be observed that the sliding motion of the slide 26 along the rod 25 is quite independent of the translation of the truck along the shaft 1 and depends solely upon the translation of the pointer along the shaft.

A frame 31, which is fixed to the truck 15 by screws 32, 32′, the latter being adjustable, carries a scale 33 and a guiding edge 34 along which a slide 35 is movable parallel to the shaft 1. This slide is pressed against the edge 34 by a spring 36 and carries a vernier 44. A vertical spindle 37 is rotatably mounted in the slide 35 and on the said spindle a fitting which carries the guide rod 28 and a bracket 38 which carries a tracing wheel 39 are fixedly mounted, the spindle of the tracing wheel being held in position by two springs 40, 41. Ink is supplied to the tracing wheel by an inclined rubber roller 42, and a weight 43 presses the tracing wheel upon the paper.

In order to compensate for the lateral reaction on the tracing wheel as it is being moved over the paper, I provide means—for example, reversible clockwork 39′, mounted on the frame 31, and a flexible shaft 39″ coupled to the spindle of the tracing wheel—by which the tracing wheel may be rotated positively.

A slide 45 shown grooved but which may be mounted on rollers, is movable along the shaft 1 or along the scale 14, and carries a tracing spindle 47 provided with a pointer or pencil, the arrangement being such that the point of the pencil or pointer and the tracing wheel are equidistant from the shaft 1.

The truck 15 and the slide 45 are provided with verniers 48, 49 to enable accurate readings to be taken on the scale 14.

Both reels 9 and 10 tend to wind up the wire 11 and take up any slack in it, but one or other is always clamped. The thread or fine wire 11 passes from the reel 10 over the slide 45, which is provided with a clamping device 46 hereinafter referred to, then over the pulleys 23, 29, 24, 8 and back over the slide 45 to the reel 9. This arrangement may be varied as shown in the diagram, Fig. 6, the tension reel 10 being replaced by a fixed point 10′ and the reel 9 by a pulley 9′, and a tension reel 8′ being mounted on the weight 6, in addition to the pulley 8.

The clamping device 46 is adapted to clamp either end portion of the thread 11 against the face of the slide 45. In the construction illustrated it consists of a washer or plate and a thumb nut mounted on a stud projecting from the slide. When the slide 45 is moved along the shaft 1, the slack in the thread or fine wire 11 is taken up by the pulley 29, and the resultant movements of the slides 26 and 27 and of the rod or lever 28 control the direction of the tracing wheel 39.

The complete instrument is designed for the purposes hereinbefore set forth but it will be found convenient in practice to utilize part of the apparatus also for drawing the ordinates and for plotting the curve to be integrated (hereinbefore referred to as the given curve), and I will describe briefly these minor or preliminary operations as well as the procedure in drawing the integral and the differential curves, with reference to the diagram, Fig. 7.

In carrying out the minor or preliminary operations referred to, the truck may be removed from the shaft 1, and the rod which projects from the slide 45 is provided with a pencil.

To draw the ordinates: the slide 45 is held stationary, relatively to the shaft 1, the point of the pencil being then on the point O, and the carriage is then rolled over the drawing paper so that the pencil draws the abscissa OX; then the slide 45 is released, so that it can be moved freely along the shaft 1, the pencil point is brought to the point O and the slide is moved along the shaft so that the pencil draws the ordinate OY.

The curve to be integrated is then plotted. The given abscissæ having been marked on the axis OX the pencil point is brought successively in coincidence with each of the marks and then moved along the shaft to a distance corresponding to the value of the ordinate. The shaft is of course kept stationary during each such operation. The value of the ordinates may be read on the scale 14. The curve H—D is thus plotted. To draw the integral curve of the curve H—D the shaft is kept parallel to the axis OY; the pointer of the slide is brought into coincidence with O and then the truck is placed at a suitable place on the shaft so that the drawing of the integral curve does not run into the curve H—D. Then one of the limbs of the thread or wire 11 is clamped; when the left limb is clamped the integral curve will run upward, while if the right is clamped the integral curve will run downward. If the left wire is clamped the right reel is clamped also; and vice-versa. The point at which the wire is clamped gives the angle of the reference line C—A of the integral curve.

Next comes the integration of the reference line OX: the pointer is brought to O and then moved along the axis OX and the tracing wheel draws at the same time the reference line C—A of the integral curve.

The carriage is then brought back to the axis of the ordinates, OY, the pointer starting this time to follow the curve H—D and the tracing wheel having been brought into coincidence with the origin C of the reference line C—A or at any distance from it on the axis OY according to the integration constant. The pointer is then moved along the curve H—D making the slide move along the shaft, but moving the latter parallel to itself. In the meanwhile the slides 26, 27, control the direction of the tracing wheel and cause it to draw the integral curve C—I. The values of the ordinates of the integral curve, referred to its reference line C—A, may be read at any moment on the scale 14.

The polar distance may be varied by moving the slide 35 along edge 34, and may be read on the scale 33.

To draw the differential curve of the curve C—I: By steering the tracing wheel successively over C—I and its reference line or curve C—A, the pencil point of the slide 45 draws successively the differential curve of each.

What I claim is:

1. In an integraph, the combination with a pointer which is moved over the original curve, a slide on which the said pointer is mounted rigidly, a tracing wheel which traces the integral curve on the same ordinate, a truck on which the said tracing wheel is pivotally carried, and a shaft on which the said slide and truck are slidable independently parallel to the ordinate and movable in unison at right angles to the said ordinate, of a slide carried by the truck, means for moving the said slide relatively to the truck at right angles to the ordinate to an extent proportionate to the extent of the movement of the pointer parallel to the ordinate, and means actuated by the said slide for controlling the direction of the tracing wheel.

2. In an integraph, the combination of a shaft, supporting wheels fixed on the said shaft to roll on the drawing paper, a truck supported at one side on rollers which bear upon and are capable of rolling along the said shaft, a tracing wheel which is mounted on the said truck so that it bears upon the drawing paper and forms a support for the said truck at its opposite side, a slide mounted upon the aforesaid shaft, a pointer carried by the said slide to bear upon the drawing paper, a slide carried by the truck, means for moving the said truck-slide relatively to the truck at right angles to the ordinate to an extent proportionate to the extent of the movement of the pointer parallel to the ordinate, and means actuated by the said truck-slide for controlling the direction of the tracing wheel.

3. In an integraph, the combination of a pointer which is moved over the original curve, a slide on which the said pointer is mounted rigidly, a tracing wheel which traces the integral curve on the same ordinate, a truck on which the said tracing wheel is pivotally carried, a shaft on which the said slide and truck are slidable independently parallel to the ordinate and movable in unison at right angles to the said ordinate, a slide carried by the truck, means for moving the said slide relatively to the truck at right angles to the ordinate to an extent proportionate to the extent of the movement of the pointer parallel to the ordinate, means actuated by the said slide for controlling the direction of the tracing wheel, and means carried by the truck for rotating the said tracing wheel positively for the purpose set forth.

4. An integraph adapted to be used as a differentiator, consisting of shaft, supporting wheels fixed on the said shaft to roll on the drawing paper, weights pivotally carried by the said shaft, a scale mounted on the said weights, a slide mounted rotatably and slidably on the said shaft, a rod projecting from the said slide at right angles to the shaft, a pointer or pencil carried rigidly by the said rod, a truck mounted rotatably and slidably on the said shaft, a scale carried by the said truck, a slide which is carried on the said truck and is adjustable thereon parallel to the said shaft, a bracket pivotally mounted on the said slide, a tracing wheel rotatably carried by the said bracket, a rigid rod carried by the said truck and projecting therefrom at right angles to the shaft, a slide mounted on the said rod, another slide which is pivotally connected to the said slide, a lever which is carried by and is slidable in its bearing in the said other slide, a vertical spindle to which the said lever and the bracket that carries the tracing wheel are fixed, tension reels and pulleys mounted on the aforesaid weights and truck, a fine wire mounted on the said reels and pulleys and passing over a pulley on the slide which is mounted on the aforesaid rigid rod carried by the truck, means for clamping the said wire upon the slide which carries the pointer or pencil, a tension reel carried at the free end of the aforesaid rigid rod, and a fine wire mounted on the said reel and connected to the slide on the said rod, all substantially as described with reference to the accompanying drawing.

JOHN PHILIP van BOGAERT.